Patented Dec. 5, 1922.

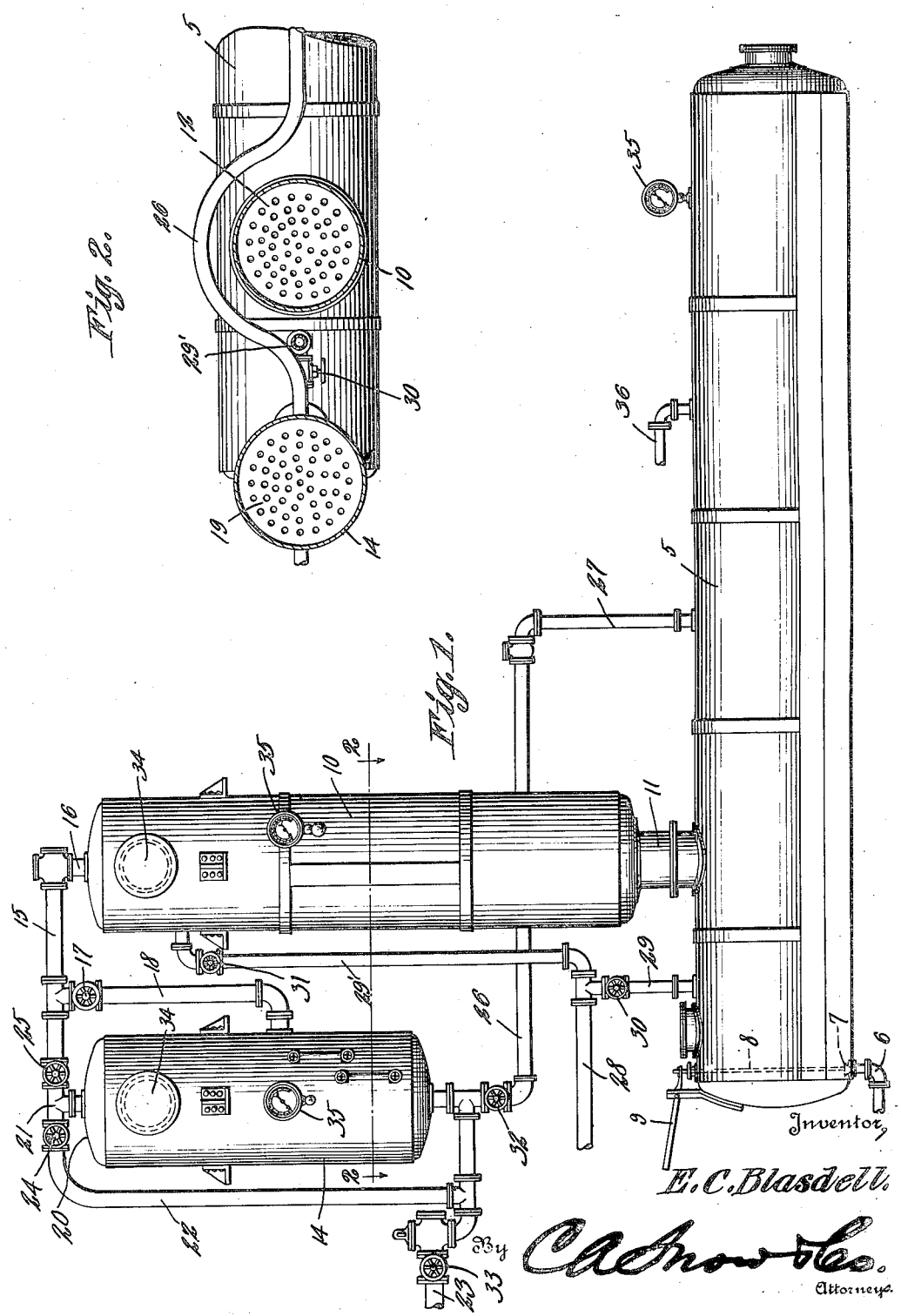

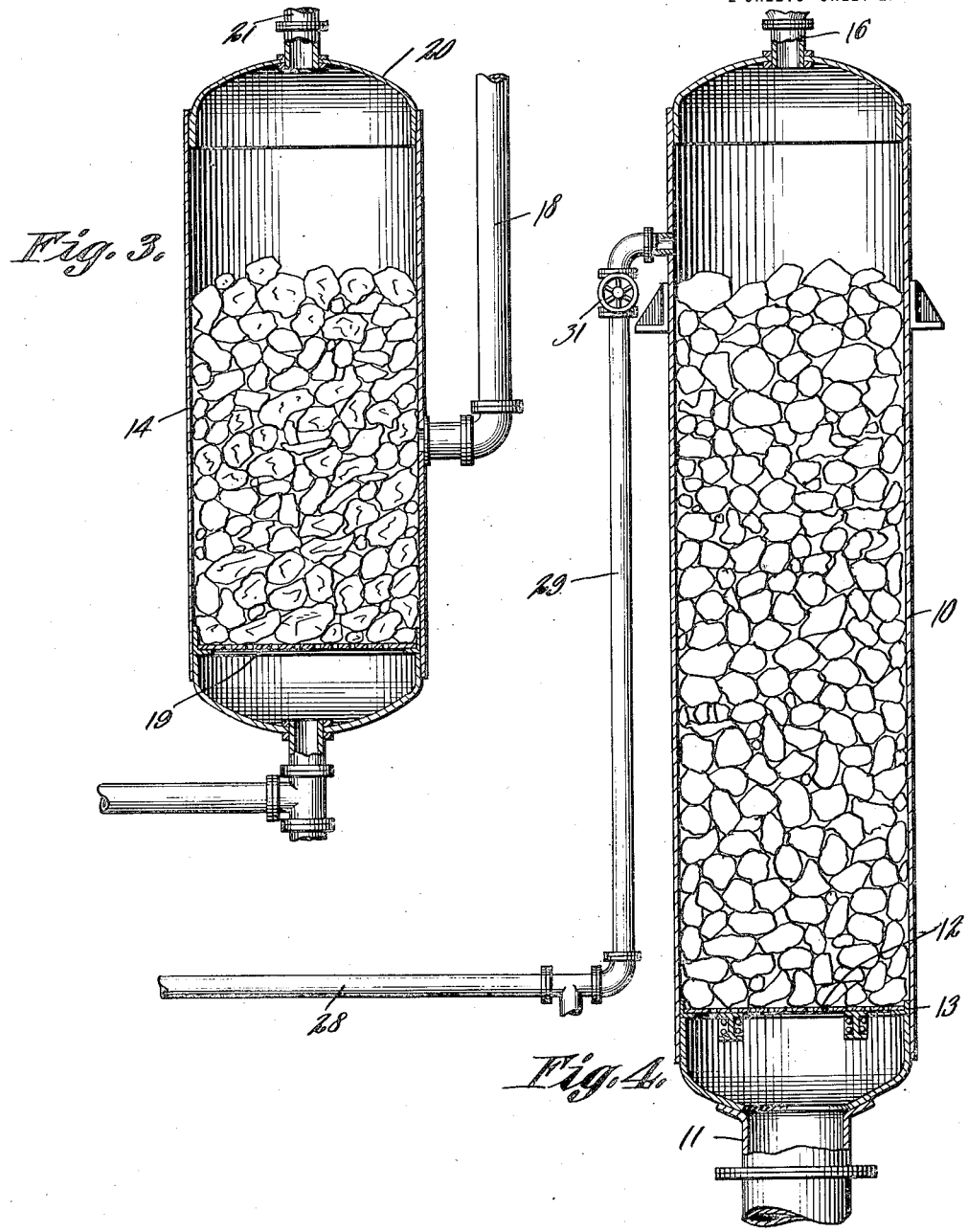

1,437,712

UNITED STATES PATENT OFFICE.

ELMER C. BLASDELL, OF GLENROCK, WYOMING.

CRACKING APPARATUS.

Application filed April 7, 1922. Serial No. 550,349.

*To all whom it may concern:*

Be it known that I, ELMER C. BLASDELL, a citizen of the United States, residing at Glenrock, in the county of Converse and State of Wyoming, have invented a new and useful Cracking Apparatus, of which the following is a specification.

This invention relates to stills and more particularly to stills especially designed for cracking hydro-carbons, such as petroleum distillates or the like, to recover highly volatile solvents.

An object of the invention is to provide a device of this character wherein the vapors passing from the evaporating vessel or tank may be condensed readily, returning the products of condensation to the evaporating tank.

A further object of the invention is to provide means for returning the various grades of liquids to insure the refining of the liquid to a high degree.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of an apparatus constructed in accordance with the present invention.

Figure 2 is a sectional view taken on line 2—2 of Figure 1.

Figure 3 is a sectional view through the smaller tank.

Figure 4 is a sectional view through the main or larger tank.

Referring to the drawings in detail, the reference character 5 designates the main or evaporating tank, which is preferably supported in a horizontal position, suitable means being provided under the tank to permit heat to be applied thereto.

A pipe 6 is in communication with the interior of the tank, there being provided a valve member 7 for controlling the passage of fluid through the pipe 6. The valve member 7 is carried by the valve rod 8 which has its upper end extending above the upper surface of the tank 5, where the same has connection with the operating handle 9, to control the movements of the valve member shown.

Supported above the evaporating tank 5 is the main condensing tank 10, which is in communication with the tank 5, as through the pipe 11, as clearly shown by Figure 1 of the drawings. Disposed within the main condensing tank 10, is a perforated supporting plate 12 which is mounted on the brackets 13 that are bolted to the side walls of the tank.

This plate 12 is designed to support a retarding element such as stones or the like, whereby the passage of the vapors will be retarded through the main condensing tank, to the end that the uncondensed vapors may pass between the stones, but the heavier liquids to the base of the tank 10, where the same are returned to the evaporating tank.

Associated with the main condensing tank 10, is a relatively small condensing tank 14 which is in communication with the tank 10 as through the pipe 15, and relatively short pipe 16, the valve member 17 being interposed in the pipe line 18 which is also in communication with the pipe 15. This pipe 18 enters the tank 14 at a point adjacent to the lower end thereof, so that any condensed vapors that pass to the pipe 15 may be carried to the lower portion of tank 14 to be returned to the evaporating tank in a manner to be hereinafter more fully described.

A perforated plate 19 is positioned in the tank 14 adjacent to the lower end thereof, which plate is also designed to support a bed of stones, the upper surface of the bed of stones lying in spaced relation with the head 20 of the tank 14 to provide a compartment allowing the vapors to pass outwardly therefrom.

Extending into the tank 14, is a pipe 21 which communicates with the pipe 22, so that vapors passing from the tank 14 may be carried off through the pipe 22 to a suitable receiving tank which is not shown in the present drawings, but which is in communication with the pipe 23. Valve members 24 and 25 control the passage of vapors through the pipe 22. Communicating with the base of the tank 14 is a return pipe 26, which is also in communication with the evaporating tank 5, through pipe 27, to the end that condensed matter may flow back into the evaporating tank.

Liquid to be treated is fed to the evaporating tank 5, through the pipe 28 which is in communication with the pipe 29, the valve 30 being provided to control the feeding of material so that when the tank 5 has received the desired quantity of material, the supply may be cut off. Vapors which may condense at the upper extremity of the condensing tank 10, may be returned to the feed pipe 28 through the pipe 29', the valve member 31 being provided to control the passage of material through the pipe 29. Valve members 32 and 33 are also provided to control the passage of fluid through the pipes 26 and 23 respectively.

Suitable manholes are provided in the condensing tanks 10 and 14, which manholes are covered by the plates 34, so that the tanks may be inspected and cleaned.

Gauges indicated at 35 are provided on the tanks to indicate the pressure in the tank to enable an operator to cut off the pressure to the tanks when the pressure reaches a predetermined degree.

Steam may be fed to the evaporating tank 5 through the pipe 36 which may be in communication with a suitable source of steam supply not shown.

The operation of the device is as follows:

The liquid to be treated is fed into the tank 5 until the same has reached the desired level in the tank, whereupon all the valves of the apparatus are closed. The necessary heat is now applied to the tank 5 creating a vapor under pressure, which pressure is maintained for a predetermined period. When the pressure in the tank 10 has reached the desired degree, as for example 80 or 85 lbs. valves 17, 24 and 33 are opened. As the vapors pass upwardly through tank 10, the stones and baffle plates in the tank 10 condense the heavier vapors and the same drop back into the tank 5 to be cracked into lighter or more volatile products.

The lighter uncondensed vapors pass through the valve member 17 and into tank 14 through the pipe 18. Due to the passage of the vapors through the stones and baffle plates of tank 14, portions of the vapors rising in tank 14, are condensed and returned to the tank 5 through pipes 26 and 27 where they are subjected to redistillation and broken up into lighter or more volatile vapors.

The uncondensed vapors which pass up through the stones or baffle plates in tank 14, pass out through pipe 21 disposed at the upper end of the tank 14 from where they pass through the valve 24 which has been opened.

The valve member 23 being open, allows the vapors to pass into suitable condenser coils not shown, from where the liquid passes to a suitable storage tank.

If it is desired to obtain a heavier grade of liquid, the apparatus is operated as follows:

All the valves of the apparatus, with the exception of valves 25 and 27 are closed. Heat is now applied to the tank 5 causing a vapor to be produced therein. As the vapor rises in tank 10, portions thereof are condensed due to the passage of the vapors through the stones and baffle plates of said tank.

It follows that the lighter uncondensed vapors collect in the upper portion of the tank 10 and are held under pressure until the desired degree of pressure has been reached, whereupon the vapors pass into tank 14 through pipe 15, where the same pass through the stones and baffle plates contained therein, and any uncondensed vapors that pass downwardly through stones and plates, pass out through the valve member 33 and into pipe 23, where the same may pass into any suitable condensing coils not shown.

Thus it will be seen that I have provided an apparatus for distilling hydro-carbons, to the end that highly volatile solvents are recovered.

What is claimed as new is:—

In a device of the character described, a horizontally disposed evaporating tank, a main condensing tank in communication with the evaporating tank and disposed thereabove, a relatively small condensing tank associated with the first mentioned condensing tank, a pipe for providing communication between the condensing tanks at the upper ends thereof, a pipe providing communication between the first mentioned pipe and the relatively small condensing tank at a point intermediate the ends of the relatively small condensing tank, a pipe for receiving fluid from the relatively small tank, valve members in the pipes for controlling the pressure of the vapor therein, and a return pipe providing communication between the relatively small tank and evaporating tank.

In testimony that I claim the foregoing as my own, I have hereto affixed my signature in the presence of two witnesses.

ELMER C. BLASDELL.

Witnesses:
R. R. GARDNER,
J. R. HIGGINS.